United States Patent Office 3,320,037
Patented May 16, 1967

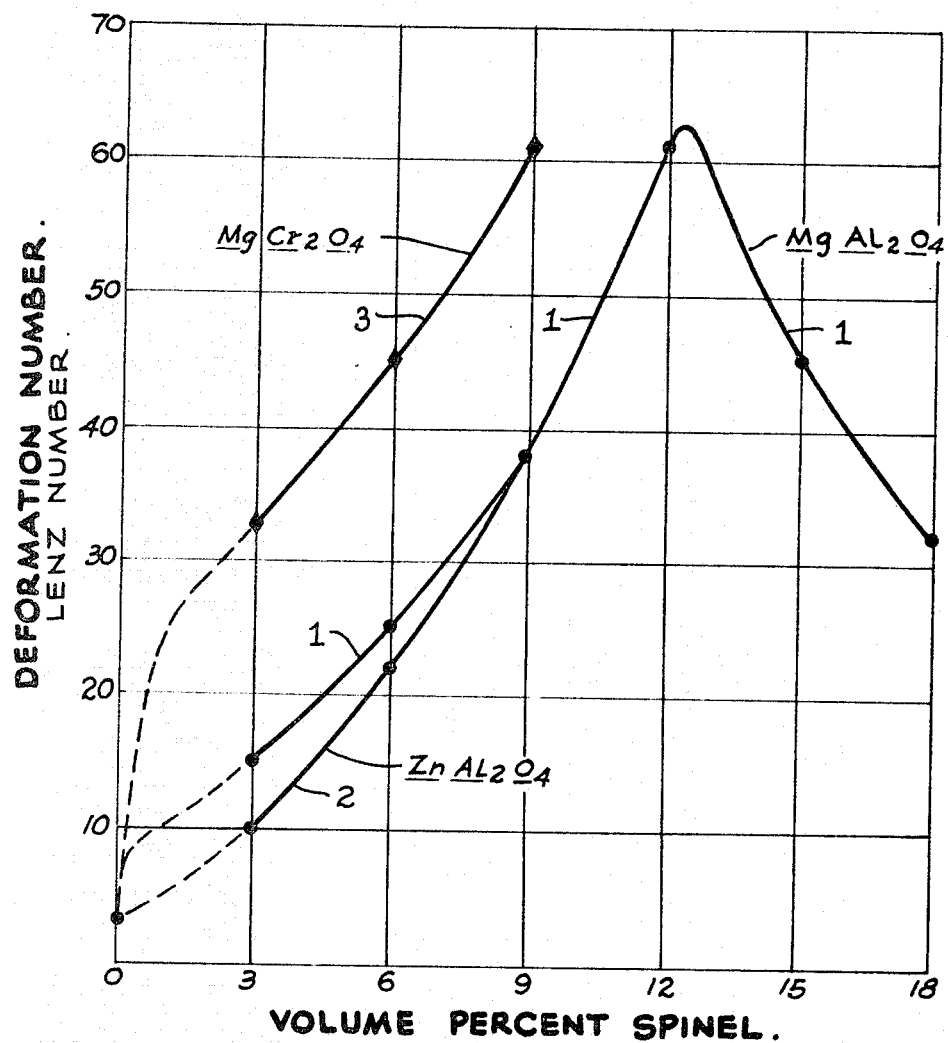

3,320,037
DUCTILE TUNGSTEN COMPOSITION CONTAINING A SPINEL DISPERSED UNIFORMLY THROUGHOUT
David M. Scruggs, Southfield, Mich., assignor to The Bendix Corporation, Research Laboratories, Southfield, Mich., a corporation of Delaware
Filed Oct. 26, 1964, Ser. No. 406,224
4 Claims. (Cl. 29—182.5)

The present invention relates to a new and improved tungsten composition having improved low temperature (room temperature) ductility compared to tungsten compositions known heretofore in the prior art.

To the extent the present invention contains inventive subject matter in common with my prior application Ser. No. 182,074, now Patent No. 3,175,279, filed Mar. 23, 1962, entitled, "Ductile Chromium Composition," and predecessor application Ser. No. 88,302, filed Feb. 10, 1961 and now abandoned, the present application is a continuation-in-part of these prior applications having common inventorship and assignees.

It is known that tungsten of commercial grade is extremely brittle at room temperature which seriously limits the use of this metal and adds considerably to the cost of machining or otherwise forming tungsten articles. Moreover, tungsten must be limited to applications where its brittle characteristic will not cause failure or add excessively to the weight of an article.

I have discovered that when spinels or spinel-like oxide formations in finely-divided form are distributed throughout a tungsten body and the tungsten body is held at elevated temperatures for a period of time, the spinels act as repositories for the minute amounts of embrittling impurities (such as nitrogen, oxygen, carbon, sulphur and perhaps hydrogen) and thereby purify the tungsten metal which increases ductility at room temperature to a degree never known before in commercially-pure material.

Spinels are a mixture of a metal monoxide and a metal sesquioxide which combine according to the general formula $MO \cdot M_2O_3$ (or $MM_2O_4$); where the M's may be the same or dissimilar metals. The monoxide and sesquioxide unite in a complex cubic crystalline structure. However, the cubic crystalline form is not critical to the practice of the present invention and certain metal oxides which combine according to the spinel formula but do not have perfect cubic symmetry can be used. The term "spinel-like oxides" used herein refers to the broader category of true spinels and those compositions corresponding to the spinel formula but having disorted lattice structure.

More specifically, the true spinel structure is essentially a close packed face centered cubic array of oxygen ions with divalent cations in one-eighth of the tetrahedral vacancy positions and trivalent cations in one-half of the octahedral vacancy positions. Inverse spinels exchange positions of the divalent ions with trivalent. The same coordination may be held while the lattice is distorted by larger divalent ions as in $CaCr_2O_4$ forming a distorted quasi-spinel structure which is no longer of cubic symmetry, but remains functional as an electronic isomorph.

It is an object of my invention therefore, to provide a composition consisting predominately of tungsten with a small percentage of spinel or spinel-like metal oxides distributed throughout to significantly increase room temperature ductility of the tungsten body even though the tungsten consitutent is formed of relatively impure commercial grade tungsten powder.

Other objects and advantages of the present invention will become apparent with reference to the accompanying description and drawing.

*Example I*

To provide a control reference for comparison purposes, a composition of 100% commercial grade −325 mesh tungsten powder (nominally 2–3 microns) was die pressed at 20,000 p.s.i. to form ⅛" thick by ½" diameter pellets.

These 100% tungsten pellets were then sintered in a corundum tube within a graphite resistor furnace in dry hydrogen (palladium purified) to 2700° F., then in argon to 3600° F. and sintered for four hours at 3600° F. The sintered pellet was 89% of theoretical density.

The pellets were then ground to a flat finish on one side with emery paper and tested for brittleness and/or ductility. The brittleness-ductility test consisted of placing the pellet in a conventional Brinell hardness test machine with a 10 mm. Brinell indenting ball in place. Load was applied until the specimen pellet cracked, whereupon the diameter of the impression made by the indenter at failure was measured in millimeters and recorded. It has been found that the volume of metal displaced by the Brinell indenter at failure is a measure of the brittleness or ductility of the specimen. Further, that the volume of metal displaced increases very nearly as the fourth power of the indentation diameter. Thus, raising the measured diameter to the fourth power gives a ductility-brittleness deformation number which can usefully be used for ductility comparison with other pellets tested in the same manner.

The deformation number for three pellets made from 100% commercial grade tungsten powder ranged from 1 to 5 and are recorded on the graph of the accompanying drawing above the 0% spinel (100% tungsten) abscissa point.

The brittleness-ductility test briefly described above was developed by William H. Lenz, associated with the Los Alamos Scientific Laboratory, and is more fully set forth in Los Alamos Scientific Laboratory's Report LAMS–2906 entitled, "A New Brittleness Test for Powder Metallurgy Materials," which can be obtained through the Office of Technical Services, U.S. Department of Commerce. The deformation number is thus also called the Lenz ductility number and has been simply abbreviated to "Lenz Number" in the accompanying graph.

*Examples II–VII*

Six pellets having varying percentages of magnesium aluminate, $MgAl_2O_4$, spinel were then prepared. The volume percent ratio of tungsten to spinel for these tests are set forth in tabular form, together with the measured deformation or Lenz number as follows:

| Example | Tungsten, Volume Percent | Spinel ($MgAl_2O_4$), Volume Percent | Deformation or Lenz No. |
|---|---|---|---|
| II | 97 | 3 | 15 |
| III | 94 | 6 | 25 |
| IV | 91 | 9 | 38 |
| V | 88 | 12 | 62 |
| VI | 85 | 15 | 45 |
| VII | 85 | 18 | 33 |

The tungsten-spinel compositions of the above examples were obtained by mixing in a rotary blender for ½ hour measured quantities of −325 mesh spinel powder and −325 mesh tungsten powder. The blended tungsten-spinel powder was then die pressed, sintered and tested for brittleness in an identical manner to that described in Example I for the 100% tungsten control sample. The densities of the specimens of Examples II through VI ranged from 88 to 89% of theoretical density which corresponded to the density of the tungsten pellet of Example I.

The results of the ductility tests for these examples are plotted and connected by curve #1 of the drawings, which shows a sharp increase in ductility with increasing spinel content up to a maximum which occurs with a spinel content of approximately 12 volume percent. Further increases in spinel content reduces ductility. The curve slope reversal proceeding in opposite directions from the 12% spinel point is explained as follows. Tungsten has a brittle-ductile transition temperature of 400° C. Above this temperature, tungsten displays ductile properties whereas below this temperature, the metal is extremely brittle as recorded in Example I. With the addition of progressively-increasing quantities of spinel from 0 up to 12 volume percent, the spinel captures progressively more of the impurities such as nitrogen and oxygen and other insterstitials by combining with them at the elevated sintering temperature. This mechanism is particularly effective in that large proportions of the free interstitials are absorbed and not re-released. Thus, the tungsten matrix metal is progressively more pure or free from embrittling impurities and will have a ductility which approaches that exhibited by tungsten above its transition temperature. At the 12% spinel point, maximum ductility inherent in the tungsten-spinel composition has been achieved by purification and further spinel addition follows the normal descending pattern of dispersion hardening by the addition of progressively larger quantities of ceramic in a base metal.

*Examples VIII–XIII*

Whereas Examples II–VII all utilized magnesium aluminate spinel, other spinel types may be used in the practice of the present invention. The following additional test pellets were prepared in the identical manner previously described wherein the spinel type was varied with results as follows.

| Example | Tungsten, Volume Percent | Spinel Type | Spinel Volume Percent | Deformation or Lenz No. |
|---|---|---|---|---|
| VIII | 97 | $ZnAl_2O_4$ | 3 | 10 |
| IX | 94 | $ZnAl_2O_4$ | 6 | 22 |
| X | 91 | $ZnAl_2O_4$ | 9 | 38 |
| XI | 97 | $MgCr_2O_4$ | 3 | 33 |
| XII | 94 | $MgCr_2O_4$ | 6 | 46 |
| XIII | 91 | $MgCr_2O_4$ | 9 | 61 |

These results are plotted on the accompanying drawing whereby curve #2 represents zinc aluminate ($ZnAl_2O_4$) spinel and curve #3 the magnesium chromate ($MgCr_2O_4$) spinel results. The density of tungsten $ZnAl_2O_4$ pellets ranged from 89 to 91% theoretical density whereas the tungsten $MgCr_2O_4$ pellets ranged from 83 to 86% theoretical. As indicated, these spinels all cause an abrupt increase of ductility and approach the negative slope portion of curve #1 (projected) as an upper ductility limit.

In general, in order to achieve the maximum potential of the high temperature capability of tungsten and to provide a stable and unmelted spinel in the processing stage, the most stable and refractory spinels such as $MgAl_2O_4$ and $MgCr_2O_4$ are preferred. For less severe requirements, other spinel or spinel-like ceramics such as $NiAl_2O_4$, $ZnAl_2O_4$, $CaCr_2O_4$ may be selected.

As indicated by the results obtained, improved ductility of room temperature tungsten may be obtained with spinel additions of less than about 20 to 25 volume percent. The preferred range giving results having good repeatability and easy to duplicate under normal production standards can be achieved with spinel contents from 3 to 15% by volume.

It will be appreciated that spinels are abundantly available, are generally of low cost, and in the percentages employed, provide minimum dilution of the tungsten material. Thus, the invention provides a low cost practical means to achieve tungsten ductility readily adaptable to large scale production needs while causing a minimum deterioration in the high temperature resistant capability of tungsten.

While the invention has been described in detail with reference to specific examples relating to selected test work, it is my intention to cover all variations in the invention herein disclosed coming within the scope of my teachings to the extent permitted by the prior art and as defined in the appended claims.

I claim:
1. A ductile tungsten composition consisting essentially of a sintered tungsten composite having a spinel dispersed uniformly throughout, said spinel being in finely divided form and comprising less than about 20% of the total volume of the two materials.

2. A ductile tungsten composition consisting essentially of a sintered tungsten composite having a spinel-like ceramic dispersed uniformly throughout, said spinel-like ceramic being in finely divided form and comprising less than about 20% of the total volume of the two materials, and said spinel-like ceramic is selected from the groups consisting of magnesium aluminate, magnesium chromate, zinc aluminate, nickel aluminate, calcium chromate, and mixtures of any of magnesium aluminate, magnesium chromate, zinc aluminate, nickel aluminate and calcium chromate.

3. A ductile tungsten composition consisting essentially of a sintered tungsten composite having a refractory spinel dispersed uniformly throughout, said refractory spinel being in finely divided form and comprising from about 3 to 15% of the total volume of the two materials.

4. A ductile tungsten composition consisting essentially of a sintered tungsten composite having a refractory spinel dispersed uniformly throughout, said refractory spinel being in finely divided form and comprising from about 3 to 15% of the total volume of the two materials, and said refractory spinel selected from the groups consisting of magnesium aluminate, magnesium chromate, and mixtures of magnesium aluminate and magnesium chromate.

References Cited by the Examiner

UNITED STATES PATENTS

| | | |
|---|---|---|
| 2,431,660 | 12/1945 | Gaudenzi. |
| 2,903,544 | 9/1959 | Reichelt _____ 29—182.5 X |
| 2,972,529 | 2/1961 | Alexander. |
| 3,019,103 | 1/1962 | Alexander _____ 29—182.5 X |
| 3,024,110 | 3/1962 | Funkhouser _____ 75—206 |
| 3,085,876 | 4/1963 | Alexander _____ 29—182.5 X |
| 3,087,234 | 4/1963 | Alexander _____ 29—182.5 X |
| 3,097,421 | 7/1963 | Cronin _____ 29—182.5 |
| 3,148,981 | 9/1964 | Ryshkewitch _____ 75—206 |

CARL D. QUARFORTH, *Primary Examiner.*

BENJAMIN R. PADGETT, *Examiner.*

A. J. STEINER, *Assistant Examiner.*